US010265719B2

(12) United States Patent
Maki et al.

(10) Patent No.: US 10,265,719 B2
(45) Date of Patent: Apr. 23, 2019

(54) METHOD AND APPARATUS FOR COATING DISCRETE PATCHES

(75) Inventors: Eric Maki, DePere, WI (US); George Glenn, DePere, WI (US); Kim Anderson, DePere, WI (US)

(73) Assignee: Durr MEGTEC, LLC, DePere, WI (US)

( * ) Notice: Subject to any disclaimer, the term of this patent is extended or adjusted under 35 U.S.C. 154(b) by 261 days.

(21) Appl. No.: 14/008,103

(22) PCT Filed: Apr. 13, 2012

(86) PCT No.: PCT/US2012/033508
§ 371 (c)(1),
(2), (4) Date: Oct. 30, 2013

(87) PCT Pub. No.: WO2012/142405
PCT Pub. Date: Oct. 18, 2012

(65) Prior Publication Data
US 2014/0255607 A1    Sep. 11, 2014

Related U.S. Application Data

(60) Provisional application No. 61/474,985, filed on Apr. 13, 2011.

(51) Int. Cl.
*B05B 15/00* (2018.01)
*B05C 5/02* (2006.01)
(Continued)

(52) U.S. Cl.
CPC ........... *B05C 5/0258* (2013.01); *B05B 12/16* (2018.02); *B05C 5/0254* (2013.01);
(Continued)

(58) Field of Classification Search
CPC ............ B05C 11/1026; B05C 11/1039; B05C 5/0254; B05C 11/1021; B05C 11/1023; H01M 4/0404
(Continued)

(56) References Cited

U.S. PATENT DOCUMENTS 4,064,288 A    12/1977    Shah et al.
4,108,110 A    8/1978    Berry
(Continued)

FOREIGN PATENT DOCUMENTS

CA    2171990 A1    9/1996
CN    1662671 A     8/2005
(Continued)

OTHER PUBLICATIONS

Canadian communication dated Dec. 10, 2015 in co-pending Canadian patent application No. 2,836,081.
(Continued)

*Primary Examiner* — Laura Edwards
(74) *Attorney, Agent, or Firm* — Nields, Lemack & Frame, LLC

(57) ABSTRACT

An improved system for applying a coating to a sheet is disclosed. The system allows precise control of the actuation of the valves and movement of the nozzle to create a plurality of coating profiles. The system includes a controller, which is used to actuate the valves to begin and terminate the flow of material onto the sheet through a nozzle. In addition, the controller may move the nozzle from its operative position to an inoperative position away from the sheet. In some embodiments, a fluid displacement mechanism is used. The controller is also able to coat the opposite side of the sheet. Registration of the coating can be programmed to be in exact alignment, or advanced or delayed by a specific amount.

2 Claims, 9 Drawing Sheets

(51) Int. Cl.
    *B05C 11/10*     (2006.01)
    *B05B 12/16*     (2018.01)
    *H01M 4/04*     (2006.01)

(52) U.S. Cl.
    CPC ...... *B05C 11/1015* (2013.01); *B05C 11/1021* (2013.01); *B05C 11/1023* (2013.01); *B05C 11/1026* (2013.01); *H01M 4/0404* (2013.01)

(58) Field of Classification Search
    USPC .......................................................... 118/429
    See application file for complete search history.

(56) References Cited

U.S. PATENT DOCUMENTS

| | | | |
|---|---|---|---|
| 4,288,475 | A | 9/1981 | Meeker |
| 4,912,948 | A | 4/1990 | Brown et al. |
| 5,360,629 | A | 11/1994 | Milbourn et al. |
| 5,779,184 | A * | 7/1998 | Kaufmann ......... B65H 19/1821 226/195 |
| 5,989,622 | A | 11/1999 | Iwashita et al. |
| 6,540,833 | B1 | 4/2003 | Gibson et al. |
| 6,561,884 | B1 | 5/2003 | White et al. |
| 6,984,412 | B2 | 1/2006 | Tanaka |
| 9,908,142 | B2 | 3/2018 | Anderson et al. |
| 2001/0012588 | A1* | 8/2001 | Kaido ..................... H01M 4/04 429/233 |
| 2002/0007552 | A1 | 1/2002 | Singleton et al. |
| 2004/0030514 | A1 | 2/2004 | Popp et al. |
| 2004/0062866 | A1 | 4/2004 | Masuda et al. |
| 2004/0094263 | A1 | 5/2004 | Middelstadt et al. |
| 2005/0089640 | A1 | 4/2005 | Tanaka |
| 2005/0136189 | A1 | 6/2005 | Blincoe et al. |
| 2005/0158467 | A1* | 7/2005 | Buckley ................ B05C 5/0225 427/230 |
| 2005/0223976 | A1 | 10/2005 | Platzer |
| 2006/0210714 | A1 | 9/2006 | Huizinga et al. |
| 2008/0041305 | A1 | 2/2008 | Pekurovsky et al. |
| 2008/0276488 | A1 | 11/2008 | Seidl et al. |
| 2009/0130323 | A1 | 5/2009 | Elsner |
| 2009/0218046 | A1 | 9/2009 | Yamamoto et al. |
| 2014/0120258 | A1 | 5/2014 | Anderson et al. |
| 2016/0096191 | A1 | 4/2016 | Anderson et al. |

FOREIGN PATENT DOCUMENTS

| | | |
|---|---|---|
| CN | 101522990 A | 9/2009 |
| CN | 101574684 A | 11/2009 |
| CN | 201616811 U | 12/2010 |
| EP | 1895051 A1 | 3/2008 |
| JP | 61-220759 A | 10/1986 |
| JP | 9-108605 A | 4/1997 |
| JP | 2001-191005 A | 7/2001 |
| JP | 2011-92855 A | 5/2011 |
| JP | 2014-522352 A | 9/2014 |

OTHER PUBLICATIONS

Chinese communication, with English translation, dated Aug. 31, 2015 in co-pending Chinese patent application No. 20120027173.1.
European communication dated Nov. 5, 2014 in co-pending European patent application No. 12792286.2.
Canadian communication dated Mar. 5, 2015 in co-pending Canadian patent application No. 2,836,081.
Japanese communication, with English translation, dated Jun. 16, 2015 in co-pending Japanese patent application No. 2014-513779.
Korean communication, with English translation, dated Aug. 19, 2015 in co-pending Korean patent application No. 10-2013-7031646.
Office action dated Sep. 14, 2015 in co-pending U.S. Appl. No. 14/122,753.
International Search Report and Written Opinion dated Jul. 5, 2012 in corresponding PCT application No. PCT/US2012/033508.
International Preliminary Report on Patentability dated Oct. 24, 2013 in corresponding PCT application No. PCT/US2012/033508.
International Search Report and Written Opinion dated Aug. 27, 2012 in co-pending PCT application No. PCT/US2012/040667.
International Preliminary Report on Patentability dated Dec. 19, 2013 in co-pending PCT application No. PCT/US2012/040667.
Chinese communication, with English translation, dated Apr. 20, 2016 in co-pending Chinese patent application No. 201280027173.1.
Korean communication, with English translation, dated Mar. 9, 2016 in co-pending Korean patent application No. 10-2013-7031646.
Office action dated Mar. 9, 2016 in co-pending U.S. Appl. No. 14/122,753.
Canadian communication dated Jul. 7, 2016 in co-pending Canadian patent application No. 2,836,081.
Office action dated Aug. 24, 2016 in co-pending U.S. Appl. No. 14/966,108.
Office action dated Nov. 30, 2016 in co-pending U.S. Appl. No. 14/966,108.
Final rejection dated Sep. 22, 2016 in co-pending U.S. Appl. No. 14/122,753.
Japanese communication, with English translation, dated May 30, 2017 in co-pending Japanese patent application No. 2016-129046.
Office action dated Jul. 5, 2017 in co-pending U.S. Appl. No. 14/966,108.
Chinese communication, with English translation, dated Jun. 26, 2017 in co-pending Chinese patent application No. 201610036200.1.
Korean communication, with English translation, dated Aug. 7, 2017 in co-pending Korean patent application No. 10-2017-7012394.
Examiner's Answer to Appeal Brief dated Sep. 26, 2017 in co-pending U.S. Appl. No. 14/122, 753.
Notice of allowance dated Oct. 20, 2017 in co-pending U.S. Appl. No. 14/966,108.
Korean communication, with English translation, dated Mar. 9, 2017 in co-pending Korean patent application No. 10-2016-7011923.
European communication dated Apr. 5, 2017 in co-pending European patent application No. 12792286.2.
Japanese communication, with English translation, dated May 8, 2018 in co-pending Japanese patent application No. 2016-129046.
Korean communication, with English translation, dated Feb. 14, 2018 in co-pending Korean patent application No. 10-2017-7032068.
Indian communication, with English translation, dated Sep. 28, 2018 in co-pending Indian patent application No. 9994/DELNP/2013.
Korean communication, with English translation, dated Sep. 20, 2018 in co-pending Korean patent application No. 10-2017-7032068.
Korean communication, with English translation, dated Dec. 17, 2018 in co-pending Korean patent application No. 10-2017-7032068.
European communication dated Nov. 5, 2018 in co-pending European patent application No. 12792286.2.
Canadian communication dated Jan. 14, 2019 in co-pending Canadian patent application No. 2,981,441.

\* cited by examiner

METHOD AND APPARATUS FOR COATING DISCRETE PATCHES

This application claims priority of U.S. Provisional Patent Application Ser. No. 61/474,985, filed Apr. 13, 2011, the disclosure of which is incorporated herein by reference in its entirety.

BACKGROUND OF THE INVENTION

There are various applications in which is it desirable to deposit a coating onto at least a portion of a sheet of material. For example, in some embodiments, the electrodes of batteries are produced by applying a layer or coating to a sheet, and then cutting the sheet into portions of a suitable dimension. Of particular importance is that the layer be applied at a uniform thickness. In some embodiments, the layer or coating is not applied to the sheet in the region where the sheet will subsequently be cut.

Based on this, it is necessary to provide a system that can apply a uniform layer or coating to a sheet, with the ability to enable and disable the application of that layer as required. FIG. 1 shows a system which may be used to apply such a layer of coating to a sheet.

The system 100 includes a sheet of material 10 to be coated, which typically proceeds through the system by passing over one of more rollers 15.

The coating is typically held in a tank or reservoir 30. The coating is drawn from the reservoir 30, through conduit 31 by pump 40. The coating is then passed through conduit 32 by the action of the pump 40.

In the case where coating is not being applied to the sheet 10, bypass valve 50 is open while supply valve 60 is closed. This allows the coating that is pumped through conduit 32 to pass through conduit 33 and back to reservoir 30.

In the case where coating is being applied to the sheet 10, the bypass valve 50 is closed, while supply valve 60 is opened. This permits the flow of coating through conduit 62 to the nozzle 70, and onto the sheet 10. While the supply valve 60 is open, the coating is discharged by the nozzle 70. However, when the supply valve 60 is closed, the pressure needed to propel the coating through the nozzle 70 is eliminated. In some cases, this causes excess coating material to remain in the cavity, or manifold 71, and the lips 72 of the nozzle.

When the supply valve is next opened, this excess material may cause an uneven application of coating to the sheet 10. FIG. 2 shows an example of the result of this phenomenon on the coated patch thickness. Coated patch 500 is shown as a cross-section profile of thickness "x" applied to web 10. As the sheet moves toward the left, starting profile 520 is thicker than the rest of the coating 500. This excess material 510 is due to the residual coating material that remained in the nozzle 70 after the supply valve was closed 60. In this figure, the ending profile 525 is shown to be uneven, as the valves may be transitioning while the coating is still being applied. Such an uneven coating may be unacceptable.

Therefore, to prevent this uneven application, a fluid suction mechanism 80' may be used, as shown in FIG. 1. This fluid suction mechanism is used to draw the excess coating that is left in the manifold 71 or on the lips 72 away from the nozzle 70.

In operation, pump 40 draws coating material from reservoir 30. The coating material passes through conduits 31, 32 and is directed toward the nozzle 70, where it is discharged onto the sheet 10 as the sheet is drawn past roller 15.

To stop the flow of coating onto the sheet 10, the bypass valve 50 is opened and the supply valve 60 is closed, thereby diverting the coating material through conduit 33 and back into the reservoir 30. To remove excessive coating material that may be present in the manifold 71 or on the lips 72 of the nozzle 70, valve 85 is opened to suction source 80 so that fluid is drawn by vacuum through conduit 86 which is in fluid communication with die manifold 71. The suction source 80 is typically comprised of a vacuum reservoir tank in communication with a suction pump to create a draw of fluid from die cavity 71 when valve 85 is opened. Coating fluid material is collected in said reservoir tank and periodically removed for reuse or, more often, discarded as waste material.

To restart the flow of coating onto the sheet 10, valve 85 is closed to remove the vacuum drawing fluid through conduit 86. Bypass valve 50 is closed while supply valve 60 is opened.

In some embodiments, the nozzle 70 can be moved relative to the roller 15 so as to minimize the amount of coating material that may drip out onto the sheet 10. The nozzle 70 may move in the direction of the sheet (i.e. up and down in FIG. 1). In other embodiments, the nozzle 70 moves orthogonal to the sheet (i.e. in and out of the page). The movement of the nozzle 70 may be linear or rotational.

It would be advantageous if there were no need for a fluid suction mechanism in the system and the associated handling and disposal of coating fluid. Furthermore, it would be beneficial if there were an enhanced system and method for creating a coating on a sheet, where the starting profile and ending profile may be controlled to create various patterns at high production rates without the use of a suction mechanism.

SUMMARY

An improved system for applying a coating to a sheet is disclosed. The system allows precise control of the actuation of the valves and movement of the nozzle to create a plurality of coating profiles. The system includes a controller, which is used to actuate the valves to begin and terminate the flow of material onto the sheet through a nozzle. In addition, the controller may move the nozzle from its operative position to an inoperative position away from the sheet. In some embodiments, a fluid displacement mechanism is used. The controller is also able to coat the opposite side of the sheet. Registration of the coating can be programmed to be in exact alignment, or advanced or delayed by a specific amount. In addition, the present system is a position based system, thereby being capable of automatically accommodating changes in line speed.

DETAILED DESCRIPTION

Figure 3:
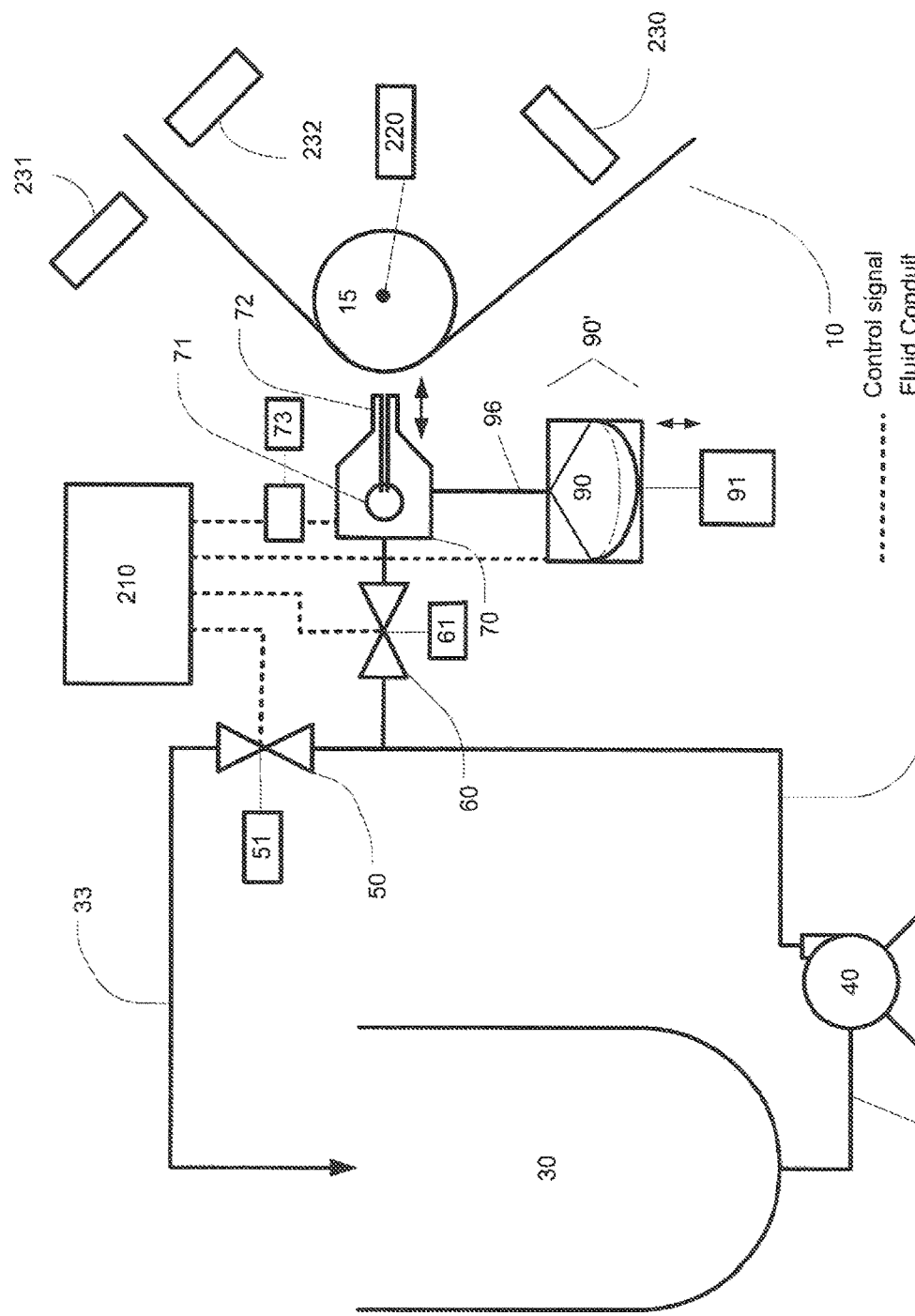
FIG. 3 shows a representative system of the present invention.

FIG. 3 shows a representative embodiment of the present invention. In this embodiment, the system comprises a reservoir 30, pump 40, bypass valve 50, supply valve 60, nozzle 70. Optionally, a fluid displacement mechanism 90' is included to alternatingly draw and replace a small volume of fluid through conduit 96. A controller 210 is incorporated into the system, which is able to control the actions of the bypass valve 50, the supply valve 60, and the nozzle 70. In some embodiments, which utilize a fluid displacement mechanism, the controller 210 controls the actions of fluid displacement actuator drive 91.

The controller 210 includes a processing unit which executes computer readable instructions, adapted to perform the actions described below. The processing unit may be a general purpose computing device, such as a microprocessor. Alternatively, it may be a specialized processing device, such as a programmable logic controller (PLC). The controller 210 also contains a storage element, which is used to store the instructions, as well as provide temporary storage for the processor's use. The storage element may utilize any memory technology, such as RAM, ROM, EEPROM, Flash ROM, NVRAM, or any other suitable technology. The controller 210 also includes an input device, such as a touchscreen, keyboard, or other suitable device. The input device is used to allow the operator to input a set of parameters or a profile which should be used by the controller 210. This input device may also be referred to as a human machine interface or HMI. The controller 210 also has outputs adapted to control the valves and nozzle as described above. These outputs may be analog or digital in nature, and may provide a binary output (i.e. either on or off), or may provide a range of possible outputs, such as an analog signal or a multi-bit digital output. Using these outputs, the controller 210 is able to control the opening and closing of bypass valve 50 and supply valve 60, as well as the speed at which these operations occur. Similarly, it can control the movement of the nozzle 70, as well as the speed of that movement.

The valve actuators 51 and 61 driving valves 50 and 60, respectively, and fluid displacement actuator 91 driving chamber 90 are preferably servomotor drives having precise positioning capability at high travel speed. Preferably, the actuators 51 and 61 are capable of driving their respective valves through the travel range from open to closed and closed to open positions in less than milliseconds. Similarly, actuator 91 is selected to expand volume chamber 90 in less than 50 milliseconds and return to the compressed position in less than 50 milliseconds. Coating nozzle 70 is positioned by actuator 73, preferably a linear motor having positioning capability at high travel speed to allow movement from pull-back to operating position and from operating position to pull-back position in less than 50 milliseconds.

To establish a profile of the thickness of one or more coated patches to be applied along a length of a sheet comprising a continuous web in the direction of web travel, the operator may enter the position on the sheet referenced to a starting position, and additional reference positions defined in terms of web travel distance for control of actuation of the various valves 50, 60 and nozzle 70. These reference positions are initially determined from the desired lengths of coated and uncoated areas to be applied to the web to produce one or more coated patches of precise dimension along the direction of web movement with intervening segments of uncoated web having a second precise dimension along said web movement direction. These reference position parameters may also be adjusted depending on various criteria, such as the fluid rheology, and slot die setup.

The following describes an example in which the operator sets the parameters to produce coated patches of a precise desired length. Referring to the supply valve 60, the operator may provide the "position at which the valve opens", "position at which the valve closes", or an intermediate "open" and "closed" positions wherein the valve is partially open or partially closed. In some embodiments, the operator may supply a set of positions and a corresponding indication of the state of the valve, such as 20% open, 40% open, etc. In some embodiments, the opening and closing of the valve 60 may follow a custom mathematical curve. For example, the mathematical curve may be a linear ramp, an exponential function, a step function, or a parabolic function, or any combination of the previous. Similar parameters may be used for the bypass valve 50. In one embodiment, profiles are determined through a working knowledge of the coating being applied and by generating a corresponding timing diagram. The valve timing and open/close profiles are then refined through experimentation.

The movement of the nozzle 70 can also be controlled by the controller 210. In some embodiments, the nozzle 70 is moved by an actuator 73 perpendicular to the surface of roller 15. The operator may enter a reference position when the nozzle 70 starts moving away from the roller 15. The operator may also enter a reference position when the nozzle 70 moves toward the roller 15. Subsequently, the speed of movement is automatically adjusted based on the line speed and web position relative to the slot die. As above, a graph of the position of nozzle 70 vs. sheet position may be a simple linear ramp, an exponential function, or a parabolic function. This graph determines the speed of movement of the nozzle 70. In some embodiments, the operator may supply a set of reference positions and a corresponding indication of the state of the nozzle, such as 20% away from roller, 40% away from roller, etc.

Similarly, the movement of the optional fluid displacement mechanism 90' may be likewise programmed and controlled.

It is likely that certain combinations of parameters for the valves 50, 60, nozzle 70 and fluid displacement mechanism 90' will be utilized frequently. Therefore, in lieu of entering all of the parameters for each component separately, the operator may create a "recipe", which is a predefined set of parameters which describe the operation of all of the components. At a later time, the operator can simply enter the name of the recipe, which conveys all of the associated details movement information to the processing unit. In some embodiments, the details of each recipe are stored in the storage element in the controller 210. For example, a "recipe" may be stored that generates the coating pattern shown in FIG. 5, while a second "recipe" generates the coating pattern shown in FIG. 7. In addition, the recipe may be stored locally and control only the coated patch profiles, or it may be stored remotely as part of a larger global recipe that stores other variable conditions such as line speed, web tension, dryer settings, and settings for other equipment that is integrated to the coating line.

Figure 1:
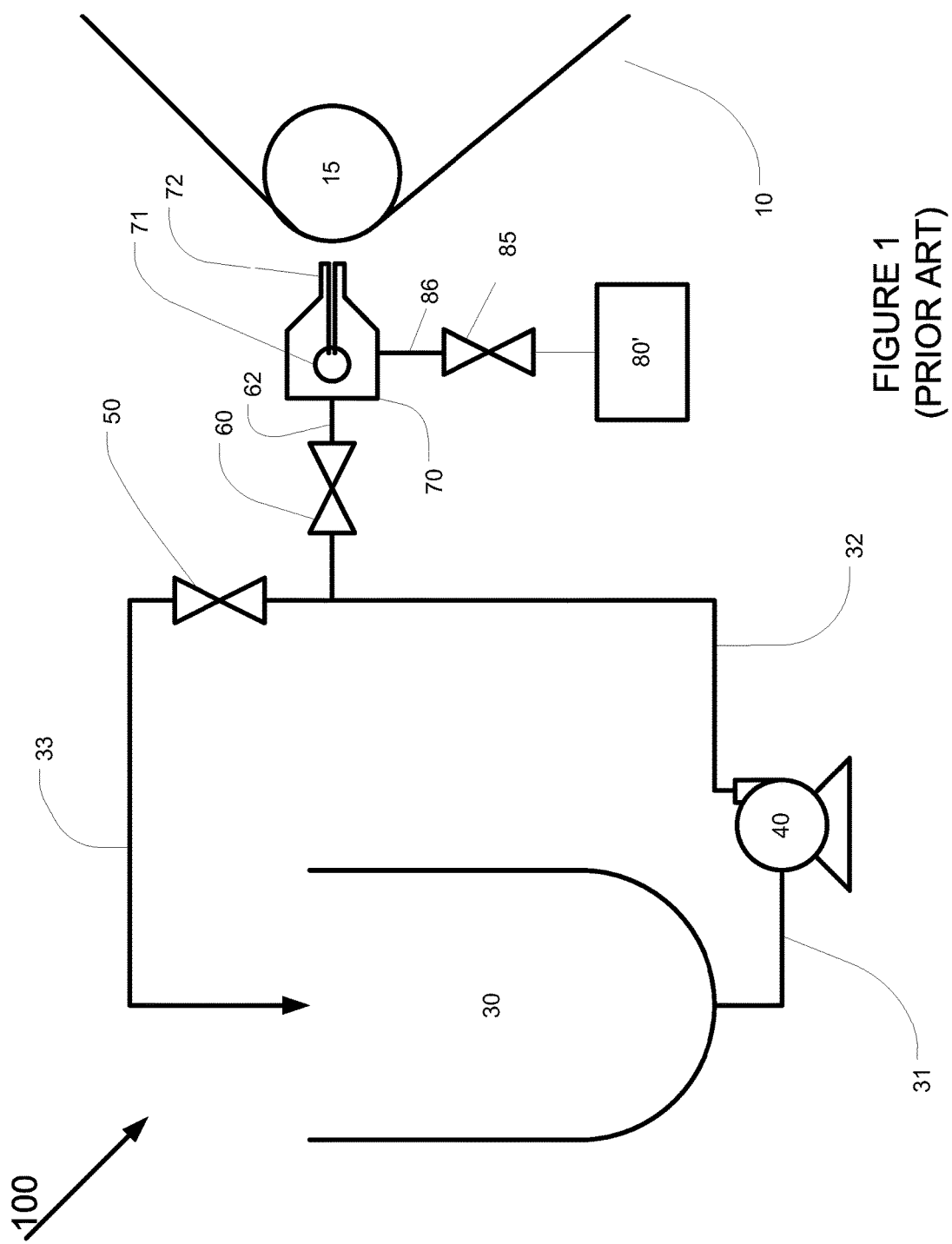
FIG. 1 shows a representative prior art system that may be used to apply a layer of coating to a sheet.
Figure 2:
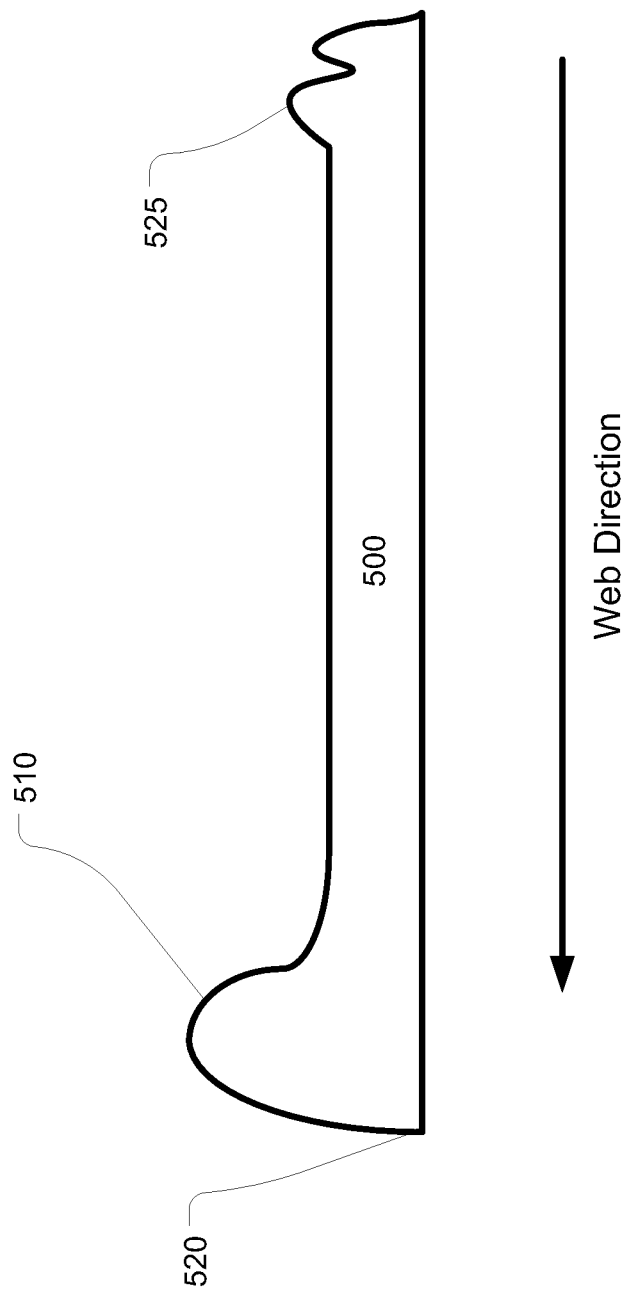
FIG. 2 shows the profile of a coating applied to the sheet using the system of FIG. 1.
Figure 4:
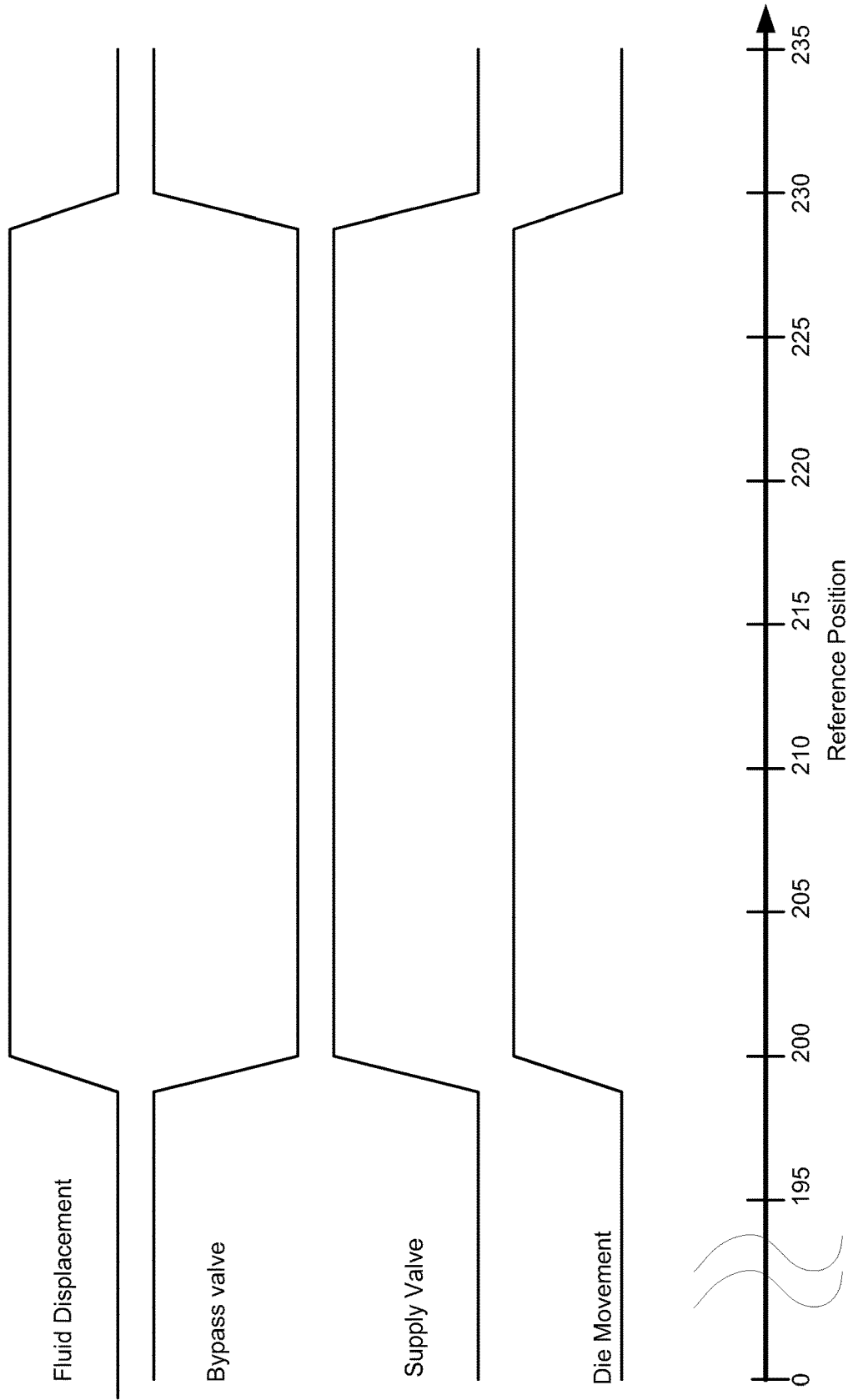
FIG. 4 shows a timing diagram used to produce the coating profile of FIG. 2.

Using this controller, the operating characteristics of the various components can be programmed to create a wide range of coating profiles. For example, FIG. 4 shows the operation of the bypass valve 50, the supply valve 60, and the nozzle 70 which can be used to create the profile shown in FIG. 2. The horizontal axis represents distance on the sheet. This profile assumes that the coating is applied for 200 mm, and then is not applied for 30 mm. This pattern is then repeated. The embodiments disclosed herein are not limited to this pattern. Indeed, the coated and uncoated portions can be as small as 1 mm and can be arbitrarily large.

The following embodiments utilize the reference position of the sheet along the direction of web travel to determine the actions of the various components. The position of the substrate materials is tracked by a high resolution encoder 220 attached to a roller shaft. In another embodiment, the encoder is coupled to a drive motor that represents web movement. Upon initial start of the coating operation, the length of web travel in relation to the location of die lips 72 is computed from encoder information and translated into terms of web reference position. The signals from encoder 220 are in communication via a data bus to the servo drive controls of servomotors 51, 61, 73 and 91 to carry out the respective positioning actions of valves 50, 60, slot die 70 and fluid displacement chamber 90, respectively. As is known to those skilled in the knowledge of application of servo drives, these positioning actions may be carried out at very high speed with excellent precision according to mathematically programmed cam action profiles defined by the user. Positioning actions of two or more actuators may be coordinated to obtain precise control of the patch location and coating thickness profile and are represented as timing diagrams.

FIG. 4 shows an example timing diagram wherein at reference position 199.5 mm, the bypass valve 50 begins to open, while the supply valve 60 begins to close. This operation is completed by reference position 200 mm, therefore the transition between the coating region and the uncoated region is very abrupt. This rapid transition tends to leave excessive coating in the nozzle 70, which is unevenly applied when the supply valve 60 next opens at time 230 (see FIG. 2). While the valves 50, 60 are being actuated, the nozzle is moved from its operational position to an inoperative position, away from the roller 15. This movement begins at reference position 199.5 mm and ends at reference position 200 mm. The coating is again applied at reference position 230 mm. In preparation for this application, the bypass valve 50 begins to close at reference position 229.5 mm. The bypass valve 50 is closed by reference position 230 mm. The supply valve 60 executes a similar profile going from the closed state to the open state beginning at position 229.5 mm and ending at position 230 mm. The nozzle 70 is also moved into the operational position as well. This movement begins at reference position 229.5 mm and is completed by reference position 230 mm.

It should be noted that while the examples presented herein demonstrate the supply valve 60 and the bypass valve 50 operating in concert, this is not a requirement. In other words, these valves 50, 60 are separate and their actuation may be controlled separately. In another embodiment, a three way valve may be employed, in which case, the actuation of these valves would be dependent on each other.

In some embodiments, particularly at higher coating speeds exceeding 5 meters per minute, a fluid displacement mechanism 90' is preferably used as shown in FIG. 3. In these embodiments, the fluid displacement mechanism 90' may be a chamber 90 having a changeable volume and a single fluid connection 96, such that when the volume increases, material is drawn away from the nozzle lips 72 into cavity 71, through conduit 96 and into the chamber. Conversely, when the volume decreases, material in the chamber 90 is forced back through conduit 96 into the nozzle cavity 71 and into nozzle lips 72 and is applied to the sheet. In the profile shown in FIG. 4, the fluid displacement chamber 90 of FIG. 3 is preferably driven by a linear actuator 91 which begins to expand the volume of chamber 90 at reference position 199.5 mm and is fully expanded by reference position 200 mm. When the material is to be applied again, the fluid displacement chamber 90 is decreased in volume by actuator 91 at reference position 229.5 mm. This chamber contraction is complete at reference position 230 mm.

Figure 9:
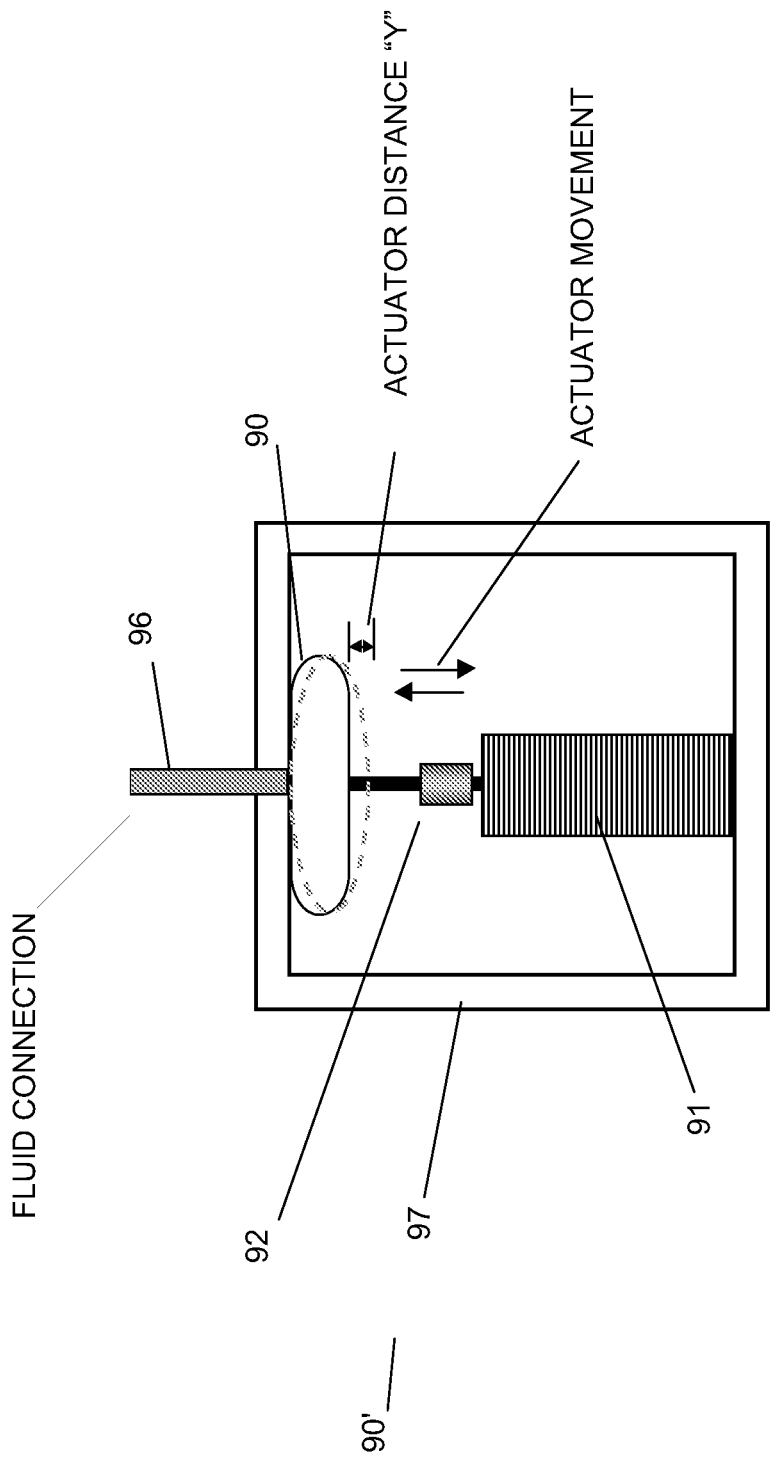
FIG. 9 shows a representative embodiment of an optional fluid displacement mechanism.

Referring to FIG. 9, the fluid displacement mechanism 90' may be comprised of a sealed bellows or diaphragm element to form chamber 90 which is attached to stationary frame 97 which supports both the chamber 90 and actuator 91. Actuator 91 is mechanically connected to the diaphragm element of chamber 90 by a mechanical coupling 92 to move the position of the diaphragm inward to chamber to reduce the internal volume, or outward from chamber 90 to increase the internal volume. Fluid conduit 96 is in fluid communication with the internal volume of chamber 90 and is also in fluid communication with the fluid system of FIG. 3. Prior to operation, the chamber 90 and conduit 96 are filled with coating fluid, coating solvent, or other suitable fluid media to prime the fluid displacement mechanism. In operation, the actuation distance "Y" is controlled by actuator 91 in accordance with the instructions from controller 210 of FIG. 3. In order to allow fast actuation of the fluid displacement action, the design of the diaphragm element of chamber 90 is to be made with consideration of minimizing the actuation distance while obtaining the desired change in internal volume in the expanded state versus the volume in the contracted state. Travel distance is preferably less than 6 mm for a response speed less than 50 milliseconds. The diaphragm may be selected from commonly available elastomeric materials, optionally reinforced with fabric strands, and sealed to a rigid shell or bowl to form the variable volume chamber 90. In a preferred embodiment, the volume chamber is constructed as a metal bellows of corrosion and solvent resistant material such as T304 stainless steel. A single bellows type is preferred for effective priming of the chamber to avoid inclusion of air bubbles during operation. The forgoing descriptions of the variable volume chamber 90 are meant to be exemplary as numerous designs of bellows and diaphragm elements are known to those skilled in the art and may be applied to meet the requirements for minimal actuation distance, fast speed, and volume displacement.

It is to be appreciated that the coating fluid contained in chamber 90, conduit 95, cavity 71 and die lips 72 undergoes a reversal in flow direction for each actuation by actuator 91 such that fluid is temporarily displaced from the exit of die lips 72 into the die cavity 71 and into fluid displacement chamber 90 when expanded and then returned via the same path to the die lips 72 when the chamber 90 is compressed. Therefore, coating fluid is not withdrawn from the process to accommodate the control of the deposition of fluid on the web to make discrete coated patches of precise dimension.

Figure 5:
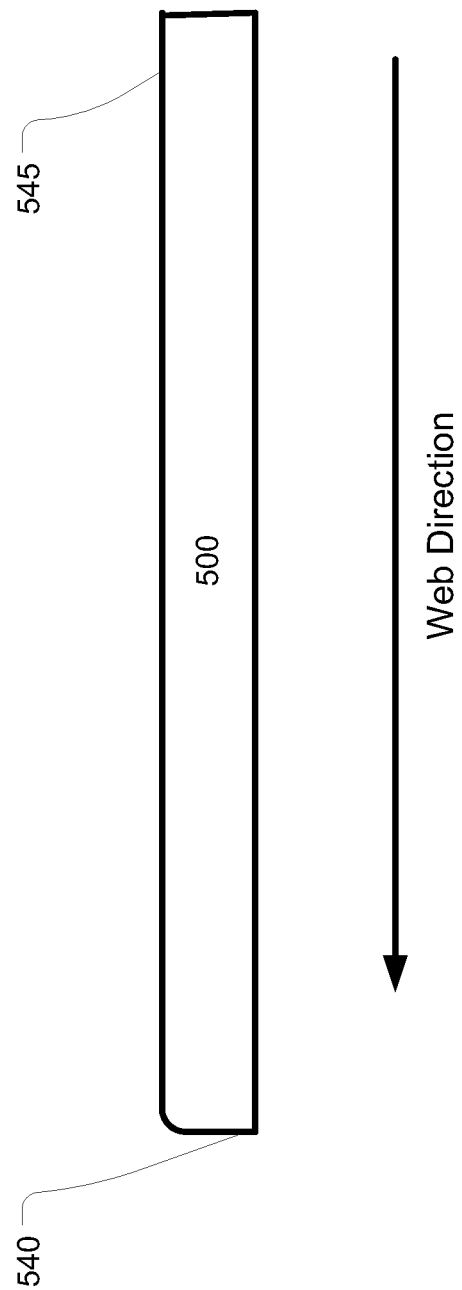
FIG. 5 shows a second profile of a coating that may be applied to a sheet.
Figure 6:
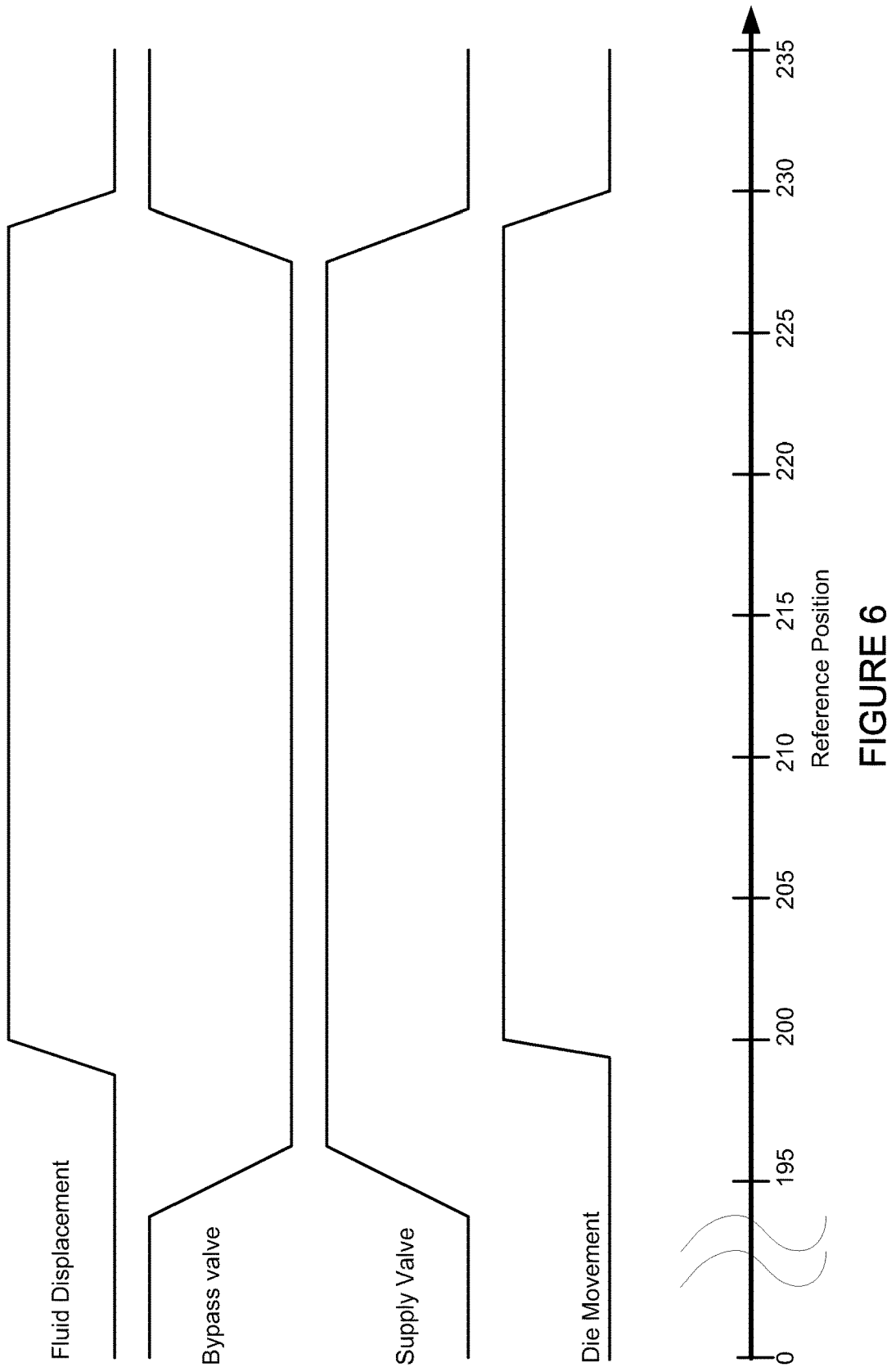
FIG. 6 shows a timing diagram used to produce the coating profile of FIG. 5.

Of course, other coating profiles may be desired. FIG. 5 shows a coating profile where the leading edge 540 is much more even than that of FIG. 2. Trailing edge 545 is also more even and abrupt. To create this profile, the timing and speed of the various components is modified from that explained in conjunction with FIG. 4. A representative timing diagram that may be used to create this coating profile is shown in FIG. 6.

In this profile, the supply valve 60 and bypass valve 50 are controlled so as to begin closing earlier. In this profile, these valves 50, 60 begin transitioning by reference position 195 mm and are completely transitioned by reference position 196 mm. The nozzle 70 is not moved until reference position 199.5 mm, and is quickly moved away from the roller 15. When the coating is to be applied again, the valves begin transitioning by reference position 228 mm and are completely transitioned by reference position 229.5 mm. The nozzle 70 is moved toward the roller 15, starting at reference position 229 mm and is completed by reference position 230 mm. In those embodiments where a fluid displacement mechanism 90' is utilized, the fluid displacement chamber 90 begins to expand at reference position 199 mm and is fully expanded by position 200 mm. Before the coating is applied again at position 230 mm, the fluid displacement chamber 90 begins to contract at reference position 229 mm. Its contraction is completed at reference position 230 mm.

Figure 7:
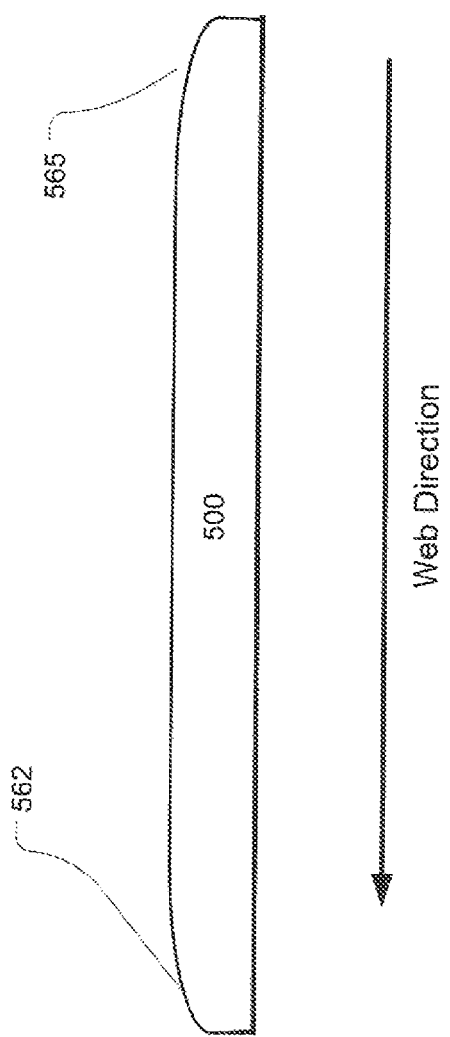
FIG. 7 shows a third profile of a coating that may be applied to a sheet.
Figure 8:
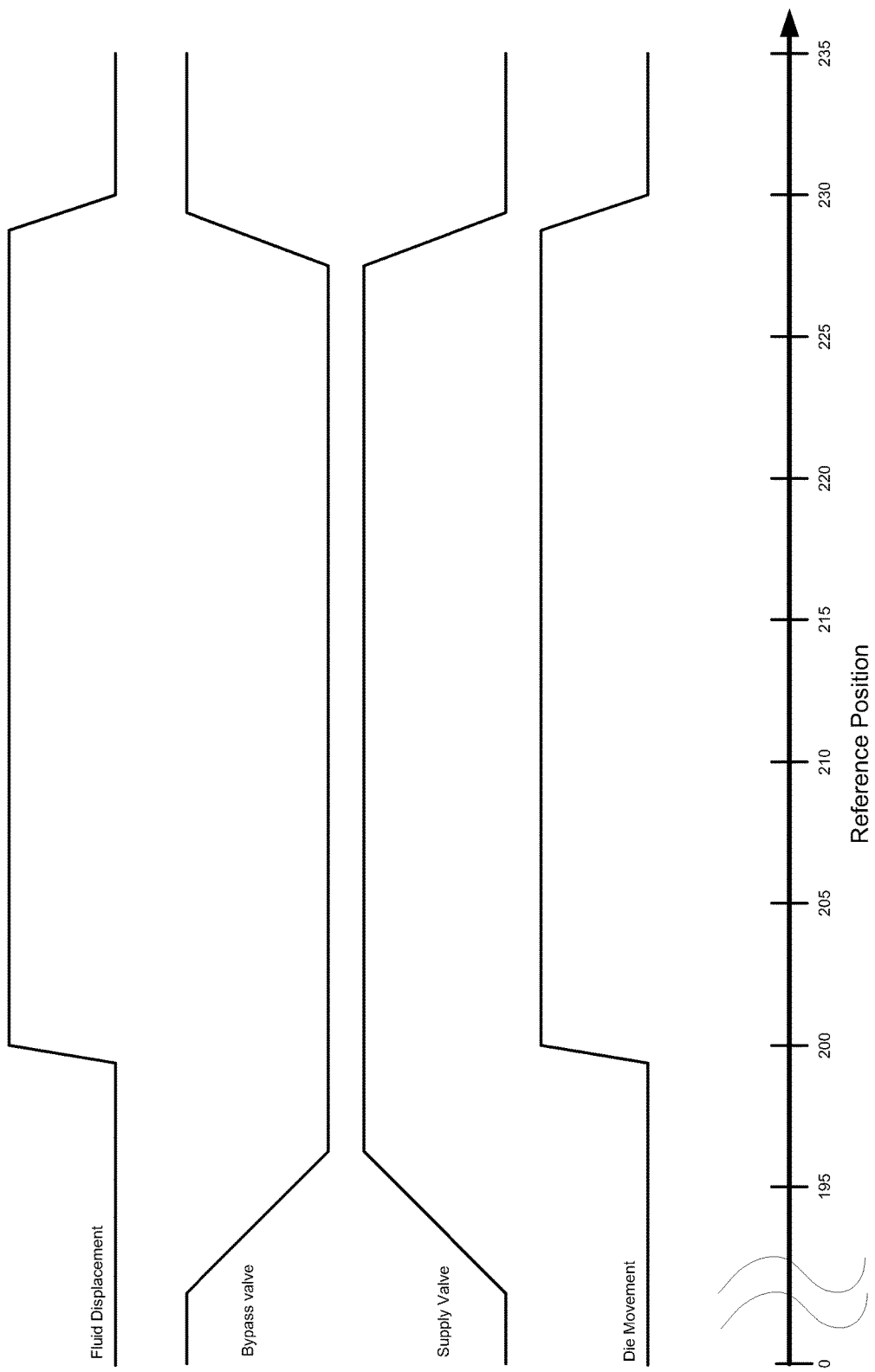
FIG. 8 shows a timing diagram used to produce the coating profile of FIG. 7.

FIG. 7 shows another coating profile that can be created using the present invention. In this embodiment, the leading edge 562 is ramped to its maximum value. Similarly, the trailing 565 is tapered, rather than abrupt. FIG. 8 shows a timing diagram that may be used to create this profile. In this embodiment, the valves 50, 60 open and close more slowly, so as to create the tapered leading edge 562 and trailing edge 565.

It should be noted that the representative timing diagrams described herein are not the only timing diagrams that can be used to create the desired coating profiles. In addition, other coating profiles are possible and can be created by varying the operation of the valves, nozzle and fluid displacement mechanism.

The use of a controller to control the actuation of the valves 50, 60 and the movement of the nozzle 70 may allow the elimination of a fluid displacement mechanism 90', particularly at coating speeds below 5 meters per minute. For example, by precisely controlling the position and the speed at which the valves turn on and off, the amount of excess coating that remains in the nozzle 70 can be reduced.

In the examples above, the system is programmed by referencing all actuations to position. In another words, the system receives input wherein an absolute position and a desired action are presented together. However, other points of references may be used to indicate when an action should take place. For example, the actions of the valves 50, 60 and the nozzle 70 may be referenced to the turn-on and turn-off positions. For example, the user may specify that the coating should be applied for 200 mm, followed by a 30 mm uncoated region. The actuation of the valves 50, 60 may be input as relative offsets from these turn-on and turn-off positions. Referring to FIG. 6, the valves would be programmed to being transitioning at position offset –6 mm (200 mm–194 mm), and would complete this transition at position offset –4 mm. Similarly, the next transition of the valves would be referenced to the turn-on position (230 mm). This method of conveying information to the controller may be extremely valuable, as it allows the same coating profiles to be used with different length regions, by simply modifying the turn-on and turn-off locations, without modification to the other parameters.

Another advantage of the position based reference system described herein is that the controller may automatically compensate for changes in coating speed. For example, if the speed of the roller 15 is changed, the controller can determine that the times associated with each actuation are different and can compensate for this change and generate the same coating profile as was done previously.

The controller can also be used to apply a coating to the opposite side of a previously coated sheet as well. In some embodiments, it is imperative that the coating patches on the first side are exactly aligned with those created on the opposite side. In other embodiments, it may be desirable to advance or delay the application of coating relative to the pattern on the first side. Using the input device, the operator can program the registration of the opposite side. In some embodiments, this is achieved by programming the start and stop positions to have a certain relationship to the previously applied coatings on the first side. In other embodiments, the operator enters the desired offset (i.e. 0 indicates alignment, positive values indicate a delay and negative values indicate an advancement). In this embodiment, the system may contain a vision system 230 as shown in FIG. 3 positioned to view the previously coated patches and capable of detecting the transition between an uncoated region and a coated region. Once this web position point is determined, the controller can use the speed of the roller 15 as computed from the signal of encoder 220 or a suitable roller drive information signal to determine the time at which coating should be applied to the second side. The vision system 230 may be comprised of a contrast sensor in data communication with controller 210 and with servo drives controlling actuators 51, 61, 71 and 91. A number of such vision systems are available in the industrial controls and sensors market and may be selected to provide fast response speed in order to report the detected transitions from coated to uncoated locations on the moving web and from uncoated to coated locations in order to effect timely action by controller 210 and the servo drives controlling servomotors 51, 61, 71, and 91. Response time for the contrast sensor device is preferably less than 100 microseconds. In embodiments including the vision system for registration of patches, the controller 210 must be capable of processing all mathematical operations to initiate the actuator and drive motor actions at a frequency at least 2 times the rate at which the desired coated patch sequences (coated and uncoated lengths) are passing by the sensor 230.

Another, more preferred type of registration controller not only senses the edge of the coating patch before it arrives at the coating head for alignment of the coating patches, but also has a second set of sensors 231 and 232 that measure the alignment of the two coated patches and compares the measured value against the target value and automatically applies a correction to the registration distance of the subsequent coated patch. This type of system provides for more robust operation by providing both feed-forward and feed-back control of the coating registration process and can automatically compensate for the time lags associated with communication delays among the various control systems used in the entire coating device. Furthermore, this preferred type of registration system improves the production yield by reducing the number of defects caused during changes in the coating line speed, or tension changes due to splices, for example.

Another benefit from the preferred coating registration method is that the coating patches are automatically measured and the measurement data can subsequently be recorded into a data logging system for statistical analysis and quality control.

The present disclosure is not to be limited in scope by the specific embodiments described herein. Indeed, other various embodiments of and modifications to the present disclosure, in addition to those described herein, will be apparent to those of ordinary skill in the art from the foregoing description and accompanying drawings. Thus, such other embodiments and modifications are intended to fall within the scope of the present disclosure. Furthermore, although the present disclosure has been described herein in the context of a particular implementation in a particular environment for a particular purpose, those of ordinary skill in the art will recognize that its usefulness is not limited thereto and that the present disclosure may be beneficially implemented in any number of environments for any number of purposes. Accordingly, the claims set forth below should be construed in view of the full breadth and spirit of the present disclosure as described herein.

What is claimed is:

1. A system for applying a coating to a material, comprising:
    a nozzle to apply said coating;
    a supply valve in communication with said nozzle to allow the flow of coating to said nozzle;
    a bypass valve to direct the flow of coating away from said nozzle;
    a fluid displacement mechanism to draw coating away from said nozzle after said supply valve has been closed, wherein said fluid displacement mechanism comprises a chamber having a diaphragm element comprising a changeable volume changeable between a compressed position and an expanded position, said diaphragm element being mechanically coupled to an actuator to expand said chamber to said expanded position with an actuation travel distance of less than 6 mm to draw coating into said chamber from said nozzle, and return said chamber to said compressed position with an actuation travel distance of less than 6 mm to force said coating out of said chamber and into said nozzle; and
    said actuator having a travel distance response time of less than 50 milliseconds and positioned such that movement of said actuator causes a change in said volume; and
    a controller in communication with said supply valve, said bypass valve, said actuator and said nozzle so as to control the application of said coating to said coating.

2. The system of claim 1, further comprising an encoder to determine a reference position of said material, wherein said controller uses said reference position to control said supply valve, said bypass valve, said actuator and said nozzle.

* * * * *